United States Patent Office 2,728,704
Patented Dec. 27, 1955

2,728,704

THERAPEUTIC COMPOSITION EFFECTIVE AGAINST MASTITIS

George T. Edds and S L Bickal, Fort Dodge, Iowa, assignors to Fort Dodge Laboratories, Inc., Fort Dodge, Iowa, a corporation of Delaware No Drawing. Application November 3, 1953, Serial No. 390,080

10 Claims. (Cl. 167—53.2)

This invention relates to a new and improved therapeutic preparation useful in the treatment of animal mastitis, this preparation being adapted for use in treating mastitis of milk cows and goats. The new therapeutic composition is especially effective in treating acute and chronic mastitis by infusion into udders of dry or lactating milk animals, especially where the diseased condition is caused by such microorganisms as Streptococcus agalactiae, Streptococcus dysgalactiae, Staphylococcus aureus, Aerobacter aerogenes, Escherichia coli, Pseudomonas aeruginosa and Corynebacteria pyogenes.

Mastitis of the teat canal, teat cistern, milk cistern, milk ducts and alveoli is an important problem in the dairy industry. The diseased condition, which occurs both in acute and chronic forms, is ordinarily the result of infection by one of the microorganisms mentioned. Each year it causes important losses to the whole dairy industry, and it is a problem not only with milk cows, but also with other lactating animals such as dairy goats.

Various remedies are now available to veterinarians and farmers for use in the treatment of mastitis, but these preparations have, in general, not shown sufficient effectiveness in inhibiting the growth of or destroying the microorganisms causing the diseased condition. Various solid compositions intended for insertion into the teat canal, usually including one or more antibiotics, as well as preparations in cream or liquid form, are now available for the treatment of mastitis, especially bovine mastitis. They are generally introduced or instilled into the udder cavities, where they can come into contact with the affected membranes as well as diffuse into the interalveolar spaces. To date however, antibiotic preparations having sufficient inhibitory activity against the microorganisms causing mastitis have not been available, and it has been necessary for the veterinarian to repeat the treatment many times, or to continue treating the animal over an extended period of time, in order to effect even a partial cure.

Some of the preparations of this type previously used in treating mastitis have included antibiotic agents, such as penicillin, streptomycin (or dihydrostreptomycin), aureomycin or terramycin or other antibiotics, and these treatment agents have sometimes also included one or more of the sulfonamides. While many of them have given satisfactory results in that they have resulted in alleviating the symptoms associated with the disease, it has been appreciated by many authorities on mastitis that some strains of the microorganisms show a resistance to the action of the chemotherapeutic agents, thereby rendering them less effective in combatting the organisms. Authorities have generally appreciated that if the activity of the antibiotics and other chemotherapeutic agents could be increased, not only would the preparation be more effective against resistant strains of the microorganisms, but the cure of the disease, or alleviation of the symptoms associated with animal mastitis, would be more rapid and certain. The intensification of the action of the chemotherapeutic agents, especially against strains of the microorganism which are more resistant, or which have developed an increased resistivity to the action of the drugs, would thus be of great importance to the entire dairy industry.

It has now been discovered that the bacteriostatic and/or bactericidal activity of antibiotics such as penicillin and streptomycin is considerably intensified if a small amount of a compound of cobalt is present along with the antibiotic. When streptomycin is referred to herein, it is intended to include within the broad scope of that term the modified forms of streptomycin, such as dihydrostreptomycin, for example, which are therapeutically equivalent to streptomycin and which are usually used interchangeably with streptomycin, by veterinarians and physicians, in the treatment of diseases.

It has been found, moreover, that the most effective preparations containing a trace of cobalt as an activating agent for the chemotherapeutic agents, and used in combatting the various mastitis-causing microorganisms referred to, should also include, in addition to penicillin and streptomycin (or dihydrostreptomycin) or other antibiotics, one or more of the sulfonamides. Among the sulfonamides that are most effectively employed in conjunction with the antibiotics, it has been found that sulfisoxatzole and sulfathiazole and/or sulfamerazine, representing the sulfapyrimidine group, being present along with the penicillin and streptomycin, are most effective in the treatment of acute and chronic mastitis when the composition contains a therapeutic amount of cobalt or one or more of the compounds of cobalt to intensify the chemotherapeutic action.

Including both penicillin and streptomycin in the preparation has been found to result in a synergistic inhibitory action against certain of the microorganisms commonly found in clinical mastitis, the one antibiotic greatly increasing the activity of the other when both are present in the therapeutic composition. Likewise, combinations of the antibiotics streptomycin plus terramycin, or terramycin plus aureomycin, cause synergistic inhibitory activity against certain of the species of microorganisms causing mastitis. Data illustrating this synergism will be given hereinafter (Table I).

The effectiveness of the therapeutic composition against the microorganisms causing mastitis is increased by including the sulfonamides, sulfisoxazole, sulfathiazole and/or sulfamerazine, representing the sulfapyrimidine group, in the preparation, as will be apparent from the data given subsequently herein tabular summary form (Table II).

In this improved treatment agent including the antibiotics and sulfonamides previously listed, it has now been found that the addition of cobalt thereto, preferably in the form of a soluble compound or salt of cobalt, further intensifies the action of the active agents by rendering the bacteria characteristic of clinical mastitis more susceptible to destruction. When cobalt or any of its compounds is present, even in relatively a very small amount, in the composition, laboratory and clinical tests have shown that previously resistant strains of the microorganisms characteristic of animal mastitis appear to be more effectively inhibited or destroyed. They are more easily inhibited or killed by the combined action of the chemotherapeutic agents, at much lower dosage levels than would be possible if the composition did not contain a trace of cobalt or any of its salts. There is a broadening of the "antibacterial spectrum"; this new product is effective against both gram-positive and gram-negative bacteria. Resistant strains of the microorganisms are rendered much more susceptible to destruction, and the prolonged treatment periods sometimes necessary to combat acute and chronic mastitis with the older preparations, not containing cobalt or any of its compounds, are no longer necessary.

The improved mastitis treatment agent with which this invention is concerned may contain the antibiotic agents, penicillin, streptomycin, aureomycin and terramycin, with the combination of penicillin and streptomycin being proved the most effective against many of the strains of bacteria associated with mastitis, as seen in Table I below, and the relative proportions of one to the other may be varied. It has been found that procaine penicillin G is especially satisfactory for use in the therapeutic composition, although other forms of penicillin, particularly the so-called "repository" forms of penicillin, such as dibenzylethylenediamine dipenicillin, are also satisfactory. Sodium penicillin or potassium penicillin, while somewhat more soluble penicillin salts, are also suitable. Either streptomycin or dihydrostreptomycin, usually in the form of a salt thereof such as the sulfate, can be used.

The levels of antibiotics in combination which are necessary to inhibit strains of the Staphylococcus microorganism are given in the following table.

This preparation may contain, in addition, both sulfisoxazole and sulfathiazole or sulfamerazine or other of the sulfapyrimidines, and we have secured very good results when two of these sulfonamides are present in approximately equal concentrations in the preparation.

As illustrative of the effectiveness of combinations of antibiotics and sulfonamides against Staphylococcus, some numerical data showing the protection against the microorganism in chick embryos, as provided by various combinations of antibiotics and sulfonamides, are given in the following table. In each case the amounts of the drugs specified were injected into a control group of five 11-day chick embryos, in all cases without mortality. The table gives the mortality rate of the embryos receiving the drug and culture, which is expressed as follows: Staphylococcus aureus strains H263–2 and 682–4 represented probable infectivity and toxicity of the staphylococci in chick embryos, the mortality rate, e. g. $\frac{1}{5}+\frac{2}{5}=\frac{3}{10}$ or 70 percent survival, and the percent negative cultures.

The average survival time of embryos dying after injection and treatment, is given in the table in days.

TABLE II

Protection provided by combinations of antibiotics and sulfonamides injected immediately following inoculation of 11-day chick embryos

| Drug | Amount of each drug injected in each embryo | Inoculation, milliliters, $10^{-4}$ dilution | Staphylococcus Strains | | | | Number Embryos | Percent Survival | Percent of Negative Cultures |
|---|---|---|---|---|---|---|---|---|---|
| | | | H263-2 | | 682-4 | | | | |
| | | | Mortality Rate | Average Survival Time | Mortality Rate | Average Survival Time | | | |
| P+S | 0.2 | 0.2 | 1/5 | 6.0 | 2/5 | 2.0 | 10 | 70 | 67 |
| P+S | 0.2 | 0.2 | 2/5 | 3.0 | 0/5 | -------- | 10 | 80 | 0 |
| P+T | 0.2 | 0.2 | 2/5 | 4.0 | 2/5 | 3.0 | 10 | 60 | 0 |
| P+SS | 0.2 | 0.2 | 3/5 | 2.3 | 3/5 | 3.3 | 10 | 40 | 50 |
| P+SM | 0.2 | 0.2 | 3/5 | 3.3 | 5/5 | 2.3 | 10 | 20 | 87 |
| P+ST | 0.2 | 0.2 | 2/5 | 3.0 | 1/5 | 3.0 | 10 | 70 | 67 |
| S+SS | 0.2 | 0.2 | 2/5 | 3.3 | 2/5 | 3.3 | 10 | 60 | 50 |
| S+SM | 0.2 | 0.2 | 3/5 | 2.0 | 3/5 | 3.5 | 10 | 40 | 33 |
| S+ST | 0.2 | 0.2 | 2/5 | 1.0 | 3/5 | 2.5 | 10 | 50 | 60 |
| A+SS | 0.2 | 0.2 | 3/5 | 3.0 | 4/5 | 2.5 | 10 | 30 | 0 |
| A+SM | 0.2 | 0.2 | 1/5 | 1.0 | 2/5 | 3.0 | 10 | 70 | 0 |
| A+ST | 0.2 | 0.2 | 2/5 | 4.5 | 1/5 | 1.0 | 10 | 70 | 0 |
| T+SS | 0.2 | 0.2 | 4/5 | 1.3 | 2/5 | 5.0 | 10 | 40 | 17 |
| T+SM | 0.2 | 0.2 | 2/5 | 1.0 | 2/5 | 3.0 | 10 | 60 | 0 |
| T+ST | 0.2 | 0.2 | 2/5 | 2.0 | 4/5 | 3.0 | 10 | 40 | 17 |
| P+SS+ST | 0.2 | 0.2 | 3/5 | 1.0 | 0/5 | -------- | 10 | 70 | 100 |
| P+SS+SM | 0.2 | 0.2 | 2/5 | 1.3 | 2/5 | 1.3 | 10 | 60 | 100 |

Key to the drugs used as given above: P=penicillin, 1,000 units per 0.2 ml.; A=aureomycin, 300 mcg. per 0.2 ml.; S=streptomycin, 300 mcg. per 0.2 ml.; T=terramycin, 300 mcg. per 0.2 ml.; SS=sulfisoxazole, 50 mcg. per 0.2 ml.; ST=sulfathiazole, 50 mcg. per 0.2 ml.; SM=sulfamerazine, 50 mcg. per 0.2 ml.

A compound of cobalt, generally a salt of cobalt such as cobalt chloride or cobalt sulfate, is also included in our mastitis treatment agent, as the presence of even very small amounts of one or more of the cobalt compounds greatly intensifies the activity of the antibiotics and sulfonamides against the microorganisms which are characteristic of acute and chronic mastitis.

TABLE I

Levels of antibiotics in combination necessary to inhibit the staphylococcal strains

| Cultures | P' | S'' | A''' | T'''' | P'+S'' | P'+A''' | P'+T'''' | S''+T'''' | T''''+A''' |
|---|---|---|---|---|---|---|---|---|---|
| H263-2 | 5.0 | 5.0 | 2.0 | 0.5 | *.02 | *1.0 | *0.2 | *.02 | *.05 |
| 682-4 | 0.2 | 0.5 | 0.5 | 0.5 | *.05 | 1.0 | 2.0 | .02 | *.05 |
| 13-4 | 0.5 | 5.0 | 1.0 | 2.0 | *.05 | 1.0 | *1.0 | *.02 | *.01 |
| 12-4 | 0.5 | 5.0 | 2.0 | 2.0 | *.02 | *1.0 | *1.0 | *.02 | *.01 |
| H85-2 | 0.2 | 0.1 | 1.0 | 1.0 | *.01 | 1.0 | 1.0 | *.02 | *.05 |
| E570-4 | 0.2 | 0.2 | 0.5 | 1.0 | *.02 | 1.0 | 2.0 | *.01 | *.05 |
| 847-4 | 0.1 | 0.1 | 0.5 | 0.5 | *.02 | 1.0 | 1.0 | *.01 | *.01 |
| H120-1 | 0.2 | 0.5 | 2.0 | 2.0 | *.02 | *1.0 | *0.5 | *.02 | *.01 |
| 831-4 | 0.2 | 0.5 | 1.0 | 1.0 | *.01 | 1.0 | 1.0 | *.02 | *.01 |
| 643-4 | 0.2 | 1.0 | 0.5 | 0.2 | *.02 | 1.0 | 0.5 | *.01 | *.05 |

KEY.—' Penicillin—concentration of penicillin in units per ml. causing inhibition of visible culture growth.
'' Streptomycin—concentration of streptomycin in mcg. per ml. causing inhibition of visible culture growth.
''' Aureomycin—concentration of aureomycin in mcg. per ml. causing inhibition of visible culture growth.
'''' Terramycin—concentration of terramycin in mcg. per ml. causing inhibition of visible culture growth.
*=combinations showing increased antibacterial activity.

The antibiotics, sulfonamides, and cobalt compound or compounds may be suspended in any suitable medium capable of permitting administration of the active agents in the treatment of lesions infected with these organisms. It has been found, however, that peanut oil is a very effective suspending agent, especially when a thixotropic agent such as aluminum monostearate is also present therein. In view of the especially good results that have been secured with this medium for suspending the active agents, especially when treating mastitis in milk animals, those preparations which include peanut oil or any other vegetable oil as a suspending medium are to be regarded as the preferred compositions.

The proportion of antibiotics to sulfonamides in the therapeutic composition may vary considerably, as may the total content of chemotherapeutic agents per milliliter of composition. Among specific ratios and concentrations which have given very satisfactory results, the following typical compositions may be regarded as illustrative.

COMPOSITION A

| Ingredient: | Content per milliliter |
|---|---|
| Procaine penicillin G | units 10,000 |
| Dihydrostreptomycin sulfate (equivalent to dihydrostreptomycin) | mg 10 |
| Sulfisoxazole | mg 75 |
| Sulfathiazole | mg 75 |
| Cobalt sulfate | mg 0.5 |

These active agents are suspended in a peanut oil base containing 3% (w./v.) of aluminum monostearate.

COMPOSITION B

| Ingredient: | Content per milliliter |
|---|---|
| Procaine penicillin G | units 30,000 |
| Dihydrostreptomycin sulfate (equivalent to dihydrostreptomycin) | mg 25 |
| Sulfisoxazole | mg 75 |
| Sulfathiazole | mg 75 |
| Cobalt sulfate | mg 0.5 |

This composition is also suspended in a peanut oil medium containing 3% of aluminum monostearate.

In using this improved therapeutic preparation, effective against mastitis in lactating animals, the composition may be infused into the teat cistern after the infected quarter has been thoroughly milked. The teat opening should be cleansed with soap and water, and a suitable antiseptic applied. Ordinarily about 10 milliliters of the composition should be infused into each infected quarter. As a precaution, and in order to secure best results in the treatment of those quarters of the animal which are infected, it is sometimes also advantageous to introduce approximately 10 milliliters of the composition into the non-infected quarters of the animal. Milking should be delayed for at least 12 hours, but after that the regular milking schedule may be followed. It is generally advantageous to repeat the treatment of infected quarters after about 72 hours. When the cow is non-lactating at the time of the treatment, it is best not to milk out the quarter, but to permit the therapeutic composition to remain in the quarter, thereby continuing its therapeutic action. Instilling the composition into the udder is best accomplished by using a sterile syringe and cannula or teat infusion tubes.

Where the animal suffers with acute septic mastitis with anorexia, fever, and prostration, simultaneous treatment with this new therapeutic preparation and with an antibiotic such as oxytetracycline (terramycin) and a sulfonamide such as sulfisoxazole (Soxisol) is sometimes desirable.

Clinical tests have shown that this new therapeutic preparation is non-irritating to the linings of the teat cistern, milk cistern, milk ducts and alveoli of milk animals, and may be used for the treatment of all types of clinical mastitis.

In preparing this new product, peanut oil (the U. S. P. grade), which is the preferred vegetable oil, is heated to approximately 90° C. In a stainless steel steam-jacketed kettle. The aluminum monostearate is then added and stirred until dissolved, the amount of aluminum monostearate added being usually about 3% on a weight per volume basis. Heating is continued until the proper consistency is secured, this step ordinarily requiring about one hour. The base is then allowed to cool, usually overnight, in a tightly covered container.

When the suspending medium is cool the sulfathiazole, sulfisoxazole or other sulfonamides and antibiotics not in micron form and cobalt or the compound of cobalt are added, and thoroughly dispersed therein by vigorous agitation with a "Lightning" mixer or other device. The resulting composition is passed through a grinding mill adjusted to comminute the sulfonamides to micron size. The composition is then collected in a suitable container, such as a sterile bottle or stainless steel drum. The proper number of units of penicillin are then added. This may be procaine penicillin G, as secured in micron size from the manufacturer. Streptomycin or dihydrostreptomycin, generally in the form of some salt thereof as the sulfate, is then added to the finely ground mixture. After thorough agitation and mixing, the composition is passed through a "Homoloid" mill, or some other type of grinding mill, into a sterile container. All containers should be kept covered during the manufacturing process, being uncovered only as necessary to introduce the composition thereinto. From the container single treatment tubes or disposable syringes containing approximately 10 milliliters of the preparation, as well as multiple dosage units each containing 100 milliliters or more of the therapeutic composition, may be prepared.

Clinical tests have been carried out to determine the comparative effectiveness of this new therapeutic composition containing a small amount of cobalt or any of its compounds as compared with the same composition containing suitable therapeutic agents, but, however, containing no cobalt or any of its compounds. These tests have clearly demonstrated that even the presence of a very small amount, merely a trace, of the cobalt compound is sufficient to greatly reduce the concentration of the therapeutic composition necessary to secure effective inhibition of microorganisms referred to above which are characteristic of animal mastitis.

For example, in an experiment wherein effectiveness against the microorganism *Aerobacter aerogenes* was tested, it was found that effective inhibition was secured with this novel therapeutic preparation containing cobalt at a concentration which was only approximately 40% of that concentration necessary to secure inhibition of growth when the same preparation containing all four chemotherapeutic agents but no compound of cobalt was used in combatting the microorganisms.

Similarly, in tests against the microorganism *Pseudomonas aeruginosa*, over ten times the concentration was necessary to secure effective inhibition of growth of this organism with a preparation containing no cobalt compound, as was necessary when the same preparation to which a trace of a compound of cobalt had been added was used in treating this characteristic organism of mastitis.

In tests against *Escherichia coli*, equal inhibition of growth was secured at about one-half the concentration when cobalt was in the therapeutic preparation containing the four active agents, as was necessary when the same preparation, containing however no cobalt, was used. Against *Staphylococcus aureus* the remarkable effect of cobalt in rendering the microorganism more susceptible to the action of the chemotherapeutics showed up to a surprising extent, since equal results inhibiting *Staphylococcus aureus* growth were secured at only about one-fiftieth the concentration when the treatment agent contained a trace of cobalt as was necessary to secure the same degree of growth inhibition when the same composition containing no cobalt was employed. Against *Staphylococcus aureus* the presence of even a minute amount of cobalt compound therefore increased the effectiveness of the preparation approximately fifty times. This remarkable ability of cobalt to render the microorganism more susceptible to the action of the combined chemotherapeutic agents is of outstanding importance to the dairy industry, since it permits the curing of mastitis and alleviation of its symptoms in milk animals in a much shorter course of treatment than is now possible with presently available therapeutics containing no cobalt.

Pratt and Dufrenoy, Journal of Bacteriology, vol. 54 (1947), pages 719–720, reported that trace amounts of cobalt enhance the antibiotic effectiveness of penicillin. They demonstrated that traces of cobalt salts added to cultures of E. typhosa, Staphylococcus aureus and E. coli markedly lower the minimum effective inhibitory concentration of penicillin. They reported also that this property of cobalt is quite specific as salts of all other heavy metals fail to produce this effect.

Similarly, Strait et al., Journal of the American Pharmaceutical Association, Scientific Edition, vol. 37 (1948), pages 133 to 135, found that traces of cobalt produced a two to four-fold increase in effectiveness of penicillin against Staphylococcus aureus, E. coli, Proteus vulgaris and B. subtilis. This action was attributed to the marked increase in the rate of bacterial growth in the initial stages of development when the rate of growth is usually slower, that is, the lag phase. Since it is known that penicillin is most effective as a bactericidal agent when the bacteria are in a state of rapid development, the authors explained the improved penicillin action along this line.

In tests carried out with sixteen producing milk cows, the yield of milk, per cow, after injection of 10 milliliters of the therapeutic composition per quarter into each animal (each 10 milliliters containing 5 milligrams of a salt of cobalt), actually increased in all but a few cases, thus further proving the complete lack of toxicity of cobalt in this new preparation. It has been found that this preparation can be safely used for treating all milk-producing animals, being especially useful for treating lactating cows and goats, without danger of either reducing milk production or poisoning the animal. In many cases the period required for the effective treatment of mastitis, whether it be of an acute or chronic nature, can be substantially reduced as a result of the remarkable effect in intensifying the activity of the chemotherapeutic agents against the bacteria, and destroying any acquired resistance that specific microorganism strains may have to the action of the active agents, when a small amount of cobalt or any of its compounds is present in the therapeutic composition along with the antibiotics and sulfonamides.

Various changes or modifications may be made in this invention, certain preferred embodiments of which have been herein described, and to the extent that such changes or modifications are within the scope of the appended claims, they are to be regarded as within the scope of this invention.

We claim:

1. A therapeutic composition effective against mastitis of milk animals which comprises penicillin; a second antibiotic selected from the group consisting of streptomycin and dihydrostreptomycin; at least one therapeutically-active sulfonamide; and a material increasing the effectiveness of the composition selected from the group which consists of cobalt and compounds of cobalt.

2. A therapeutic composition effective against mastitis of milk animals which comprises penicillin; a second antibiotic selected from the group consisting of streptomycin and dihydrostreptomycin; at least one therapeutically-active sulfonamide selected from the group which consists of sulfisoxazole and sulfathiazole; and a material increasing the effectiveness of the composition selected from the group which consists of cobalt and compounds of cobalt.

3. A therapeutic composition for topical application in the treatment of mastitis of milk animals which comprises penicillin; a second antibiotic selected from the group which consists of streptomycin and dihydrostreptomycin; at least one therapeutically-active sulfonamide selected from the group which consists of sulfisoxazole and sulfathiazole; a material increasing the effectiveness of the composition selected from the group which consists of cobalt and compounds of cobalt; and a vegetable oil containing about 3 percent of aluminum monostearate as suspending medium.

4. A therapeutic composition effective in the treatment of mastitis of milk animals by instillation into the animal udder which comprises procaine penicillin G, dihydrostreptomycin sulfate, sulfisoxazole, sulfathiazole, and cobalt sulfate.

5. A therapeutic composition effective in the treatment of mastitis of milk animals by instillation into the animal udder which comprises procaine penicillin G, dihydrostreptomycin sulfate, sulfisoxazole, sulfathiazole, and a small amount of material increasing the effectiveness of the composition selected from the group which consists of cobalt and compounds of cobalt, said constituents being suspended in an inert bland medium in amounts falling within about the following ranges, per milliliter of composition:

| | |
|---|---|
| Procaine penicillin G | 10,000 units to 100,000 units. |
| Dihydrostreptomycin sulfate | 10 mg to 250 mg. |
| Sulfisoxazole | 50 mg. to 100 mg. |
| Sulfathiazole | 50 mg. to 100 mg. |
| A material selected from the group consisting of cobalt and compounds of cobalt | Trace to 0.5 mg. |

6. A therapeutic composition effective in the treatment of mastitis of milk animals by instillation into the animal udder which comprises a suspension in peanut oil containing about 3 percent of aluminum monostearate of the following constituents, present therein, per milliliter of composition, in approximately the following amounts:

| | |
|---|---|
| Procaine penicillin G units | 10,000 to 100,000 |
| Dihydrostreptomycin (as dihydrostreptomcyin sulfate) mg | 10 to 250 |
| Sulfisoxazole mg | 75 |
| Sulfathioazole mg | 75 |
| A compound of cobalt mg | 0.5 |

7. A therapeutic composition effective in the treatment of mastitis of milk animals by instillation into the animal udder which comprises a suspension in peanut oil containing about 3 percent of aluminum monostearate of the following constituents, present therein, per milliliter of composition, in about the following amounts:

| | |
|---|---|
| Procaine penicillin G units | 30,000 to 300,000 |
| Dihydrostreptomycin (as dihydrostreptomycin sulfate) mg | 25 to 250 |
| Sulfisoxazole mg | 75 |
| Sulfathioazole mg | 75 |
| A salt of cobalt mg | 0.5 |

8. A therapeutic composition effective against mastitis of milk animals which comprises penicillin; a second antibiotic selected from the group consisting of stretptomycin and dihydrostreptomcyin; sulfisoxazole; and a material selected from the group which consists of cobalt and compounds of cobalt for increasing the effectiveness of said composition.

9. A therapeutic composition effective against mastitis of milk animals which comprises penicillin; a second antibiotic selected from the group consisting of streptomycin and dihydrostreptomcyin; sulfisoxazole; a second sulfonamide; and a material selected from the group which consists of cobalt and compounds of cobalt for increasing the effectiveness of said composition.

10. A therapeutic composition effective against mastitis of milk animals which comprises penicillin; a second antibiotic selected from the group consisting of streptomcyin and dihydrostreptomcyin; sulfisoxazole; a second sulfonamide selected from the group consisting of sulfathioazole and sulfamerazine; and a material selected from the group which consists of cobalt and compounds of cobalt for increasing the effectiveness of said composition.

References Cited in the file of this patent

UNITED STATES PATENTS

| | | |
|---|---|---|
| 2,498,374 | Martin | Feb. 21, 1950 |
| 2,507,193 | Buckwalter | May 9, 1950 |
| 2,584,166 | Stevenson | Feb. 5, 1952 |
| 2,640,801 | Burkhart | June 2, 1953 |

FOREIGN PATENTS

| | | |
|---|---|---|
| 506,413 | Canada | Oct. 12, 1954 |
| 678,823 | Great Britain | Sept. 10, 1952 |
| 686,693 | Great Britain | Jan. 28, 1953 |

OTHER REFERENCES

Sulvetil (Abbott): Drug and Cosmetic Ind., June 1950, p. 675.

Pratt et al.: "Antibiotics," J. B. Lippincott Co., Phila., 1949, pp. 90, 91, 92, 224 and 229 (particularly).

Zweig, Veterinary Record, December 3, 1949, pp. 811–813.

Cobasol: A penicillin-cobalt preparation. Unlisted Drugs, October 31, 1951, p. 134, dating back to April 1951.